J. C. GRIERE.
APPARATUS FOR THE MANUFACTURE OF DRY CRYSTALS OF SUGAR AND OTHER CRYSTALLINE SUBSTANCES.
APPLICATION FILED MAY 28, 1914.
1,230,890.  Patented June 26, 1917.
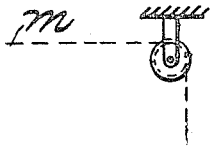
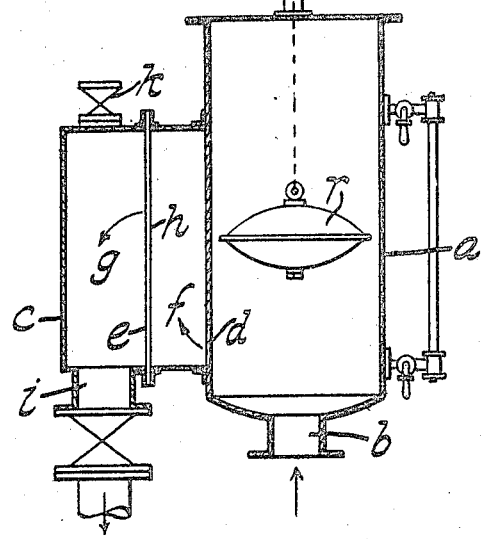
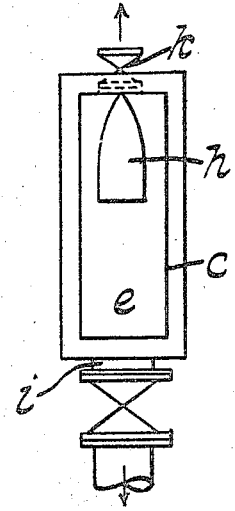
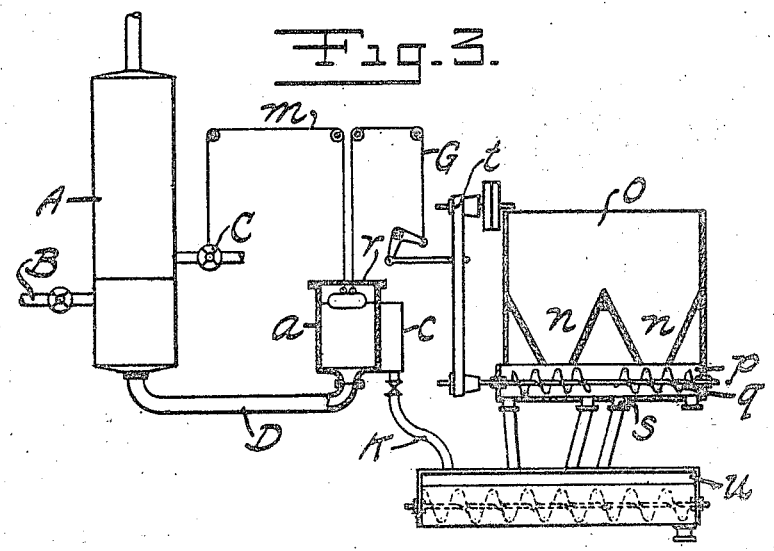
Inventor
J. C. Grière
By his Attorney

UNITED STATES PATENT OFFICE.

JEAN CHARLES GRIÈRE, OF PADUA, ITALY.

APPARATUS FOR THE MANUFACTURE OF DRY CRYSTALS OF SUGAR AND OTHER CRYSTALLINE SUBSTANCES.

1,230,890. Specification of Letters Patent. Patented June 26, 1917.

Application filed May 28, 1914. Serial No. 841,466.

*To all whom it may concern:*

Be it known that I, JEAN CHARLES GRIÈRE, a citizen of the French Republic, residing in the city of Padua, Italy, have invented a new and useful Apparatus for the Manufacture of Dry Crystals of Sugar and other Crystalline Substances; and I do hereby declare the following to be a full, clear, and exact description of the same.

This invention relates to apparatus for use in the preparation of dry crystals of sugar and other soluble crystalline substances from a hot concentrated solution, according to the process described in my companion specification No. 70,441, filed January 5, 1916.

The installation of apparatus according to the invention comprises an evaporator for concentrating the raw solution, a valve controlling the inlet of raw solution to the evaporator, a regulator tank into which the evaporator discharges continuously, a precipitating receptacle into which the tank discharges, a distributing device for delivering precipitant continuously to the receptacle, a float in the tank, a connection from the float to the inlet valve of the evaporator whereby increased discharge from the latter produces diminished supply of raw solution thereto and vice versa and a connection from the float to the distributer whereby increased discharge from the evaporator produces increased supply of precipitant to the receptacle and vice versa.

In the drawings

Figures 1 and 2 are two views of a regulating float chamber connected with the evaporator or concentrator.

Fig. 3 shows the whole apparatus.

In the further description of the apparatus, sugar will be taken as example of the material dealt with, but the apparatus is equally applicable to the manufacture and drying of any other products whose properties of solubility are similar to those of sugar. The process in which the apparatus is to be used is fully described in my companion specification No. 70,441, filed January 5, 1916, and will be only briefly outlined here as follows:

The raw liquor or solution is strongly concentrated in an evaporating or concentrating apparatus A provided with an automatically adjustable steam admission pipe B and into which the solution to be concentrated enters in a continuous manner through a regulating valve C and is discharged, likewise in a continuous manner, into a regulating device (Figs. 1 and 2) comprising a float chamber within which it moves a float which controls by means of cords or levers the inlet valve of the evaporator and the supply of precipitant to the precipitator c. From the evaporator the solution passes through the regulating device into a precipitating apparatus provided with a stirring device, and into which is also delivered the substance to be added to the solution, termed the precipitating substance, which comes from an automatic distributer. The regulation of the quantity of the entering solution and that of the precipitating substance is effected by a regulating float in the evaporator. The paste which has been formed in the precipitator passes into a kneader to be rendered completely homogeneous. The kneader from which the paste to be converted into a dry and friable crystalline product, is conveyed to a preliminary drying apparatus where it loses its pasty consistency and is converted into a semi-dry product which is more or less able to be dried; which product is then treated in a final drying apparatus. The kneader, preliminary drier and drying apparatus form no part of the present invention.

Figs. 1 and 2 show the apparatus used for automatic regulation of the concentration of the liquid, and of the addition of the precipitant.

The discharge pipe D of the concentrator is connected to a tank $a$ at the opening $b$ at the bottom of the tank.

The tank $a$ adjoins a tank $c$ communicating with the former through a bottom opening $d$. The tank $c$ is divided by a partition $e$ into two compartments $f$ and $g$ communicating with each other through an opening $h$. The latter has a special shape (Fig. 2) the object of which is to insure a discharge of the liquid through the opening $h$ in a quantity directly proportional to the level of the liquid in the tank $a$. The calculation of the cross-section of the opening is obtained by well known laws for the speed of flow of liquids through orifices.

The compartment $g$ is provided at the bottom with an outlet $i$ for the liquid and with an air outlet $k$ at the top.

In the tank $a$ is arranged a float $r$ which controls by suitable means such as a cord $m$, a regulating valve C in the pipe for supplying liquid to the concentrator, and also a device regulating the addition of the precipitating agent (for example sugar) to the concentrated solution. The rate of adding the solid material can be varied; for instance, when the distributing mechanism described later on, is used, the float brings about the shifting of the driving belt on the cone pulleys through the cord G, or the cord acts, in the case of an electric motor in a suitable manner on the resistance.

The solution which, on coming out from the concentrator passes into the tank $a$, overflows through the opening $d$ into the chamber $f$ and on reaching a given level, escapes through the opening $h$ into the chamber $g$.

As already described, the quantity of solution which is discharged, remains proportional to the height of the level in the tank $a$ owing to the shape of the opening $h$.

As the pressure of the heating steam is maintained constant in the evaporator and as in practice the solution to be concentrated has a constant density, there will be established an equilibrium proportion between the quantity of solution admitted into and the quantity of solution discharged from the concentrator; or in the case where the proportion of these quantities is modified, the concentration of the solution will likewise change.

Assuming for instance that the quantity of escaping solution increases, and that its concentration decreases, this will cause the level of the liquid to rise in the tank $a$, and consequently the float $r$ to move the device controlling the feed of the precipitating agent, so as to increase the number of revolutions of that device, with the result that the quantity of the product introduced into the solution is instantaneously increased in proportion to the reduction of concentration. At the same time the conduit for the admission of unconcentrated solution into the concentrator is closed to a greater extent by the action of the float $r$. Consequently, less solution will be admitted into the latter, and the concentration of the final solution will increase again, while its quantity will decrease, which again causes the level of the liquid and the float to sink.

At the bottom portion of a box $o$ provided with discharge hoppers $n$ is arranged a trough $p$ containing right and left handed conveyer screws $q$ adapted to convey the precipitant to outlet openings $s$ through which it drops into the precipitating device $u$. The number of revolutions of the conveyer screws can be regulated in any well known manner by means of coned pulleys on its spindle and on the driving shaft. The driving belt is moved by the float along the pulleys $t$, which varies the number of revolutions of the screws, and consequently the quantity of the substance which drops into the precipitating device. Instead of the coned pulleys, any other device for varying speed may be used.

The quantities of solution and of substance to be treated for the precipitation of the dissolved substance, are therefore measured and combined in such a manner as to allow continuous working, while maintaining the proportions required in the mixture for obtaining the desired final product.

As the concentrated and hot solution arrives in the precipitating device $u$ at one of its ends, precipitant is brought to the same end through the left hand inlet $s$ and so that the greater part of the said substance is brought into immediate contact with the solution. The two mix and the precipitation is instantaneous and effected in a continuous manner; the inlets to the right (Fig. 3) allow a further quantity of substance to fall into the apparatus $u$ so as to insure a complete precipitation and impart to the sugar paste in formation the required consistency.

When for the preparation of the product it is necessary to add solid substances, or liquids, or gases, for the purpose of modifying the composition, color, nourishing value, etc., as described in my companion specification No. 70,441, filed January 5, 1916, they can be introduced into the precipitating device through separate devices or pipes, for instance in a manner similar to that described for the introduction of the dry and friable addition into the precipitating device.

The precipitating device is constructed so as to insure a thorough mixture of the solution and of the additional substance, and at the same time moves the mass. It is therefore continually filled in a uniform manner from one end to the other; the mixtures leaves the apparatus as a more or less homogeneous paste and falls into the apparatus next in order which is a kneader.

What I claim as my invention and desire to secure by Letters Patent is:—

1. Apparatus for forming dry crystals of sugar or other soluble crystalline substances from a hot solution comprising an evaporator for concentrating the raw solution, a valve controlling the inlet of raw solution to the evaporator, a regulator tank into which the evaporator discharges continuously, a precipitating receptacle into which the tank discharges, a distributing device for delivering precipitant continuously to the receptacle, a float in the tank, a connection from the float to the inlet valve of the evaporator whereby increased discharge from the latter produces diminished supply of raw solution thereto and vice versa and a connection from the float to the distributer whereby increased discharge from the evaporator produces increased supply of precipitant to the receptacle and vice versa.

2. Apparatus for forming dry crystals of sugar or other soluble crystalline substances from a hot solution, comprising an evaporator for concentrating the raw solution, a valve controlling the inlet of raw solution to the evaporator, a two compartment regulator tank into which the evaporator discharges continuously, a precipitating receptacle into which one compartment of the tank discharges, a distributer for delivering precipitant continuously to the receptacle, a float in the other compartment of the regulator tank, a partition between the two compartments containing an aperture of designed shape such that the flow of solution through the opening is directly proportional to the level of liquid in the float compartment, a connection from the float to the inlet valve of the evaporator whereby increased discharge from the latter produces diminshed supply of raw solution thereto and vice versa and a connection from the float to the distributer whereby increased discharge from the evaporator produces increased supply of precipitant to the receptacle and vice versa.

3. Apparatus for forming dry crystals of sugar or other soluble crystalline substances from a hot solution comprising an evaporator for concentrating the raw solution, a valve controlling the inlet of raw solution to the evaporator, a regulator tank into which the evaporator discharges, a precipitating receptacle into which the tank discharges, a distributer having one or more conveyer screws for delivering precipitant continuously to the receptacle, a float in the tank, a connection from the float to the inlet valve of the evaporator whereby increased discharge from the latter produces diminished supply of raw solution thereto and vice versa and a connection from the float to the drive of the conveyer screws whereby increased discharge from the evaporator produces increased supply of precipitant to the receptacle and vice versa.

In testimony whereof, I have signed my name to this specification in the presence of two subscribing witnesses.

J. CHARLES GRIÈRE.

Witnesses:
RODOLPHE SANDHOF,
CHAS. ROY NASMITH.